(12) United States Patent
Laval et al.

(10) Patent No.: US 6,918,085 B1
(45) Date of Patent: Jul. 12, 2005

(54) PROCESS FOR STORING TEXT AND PROCEDURE FOR SEARCHING STORED TEXTS FOR THOSE PERTINENT TO A QUESTION

(75) Inventors: Philippe Laval, Paris (FR); Luc Manigot, Reuil Malmaison (FR)

(73) Assignee: Cora SA (FR)

( * ) Notice: Subject to any disclaimer, the term of this patent is extended or adjusted under 35 U.S.C. 154(b) by 0 days.

(21) Appl. No.: 09/329,909

(22) Filed: Jun. 10, 1999

(30) Foreign Application Priority Data

Jun. 10, 1998 (FR) .......................................... 98 07284

(51) Int. Cl.[7] .............................................. G06F 17/00
(52) U.S. Cl. ..................... 715/532; 715/531; 715/500.1
(58) Field of Search ................................ 715/532, 531, 715/500.1; 707/3, 4, 5

(56) References Cited

U.S. PATENT DOCUMENTS

| | | | | |
|---|---|---|---|---|
| 5,647,058 A | * | 7/1997 | Agrawal et al. ............ 395/601 |
| 5,991,755 A | * | 11/1999 | Noguchi et al. ................ 707/3 |
| 6,233,571 B1 | * | 5/2001 | Egger et al. .................... 707/2 |
| 6,326,988 B1 | * | 12/2001 | Gould et al. ................. 345/850 |
| 6,523,026 B1 | * | 2/2003 | Gillis ............................. 707/3 |

* cited by examiner

Primary Examiner—Sanjiv Shah
(74) Attorney, Agent, or Firm—Greenberg Traurig LLP; Eugene C. Rzucidlo

(57) ABSTRACT

In a multidimensional conceptual reference, a dictionary of words is created, each conceptual word of at least one portion of the text to be stored is compared to those of the dictionary to determine the position of this word in said reference, and the resultant ($T_1$) of the positions of all the conceptual words of the text portion to be stored is determined in order to determine the position of a global conceptualization of the text portion in said reference and to store this position. The position in a multidimensional conceptual reference of a global conceptualization of the question is determined, and the position of the global conceptualization of the question is compared to the homologous positions of the stored texts, in order to select at least one of them, corresponding to a searched text.

19 Claims, 1 Drawing Sheet

Figure 1:
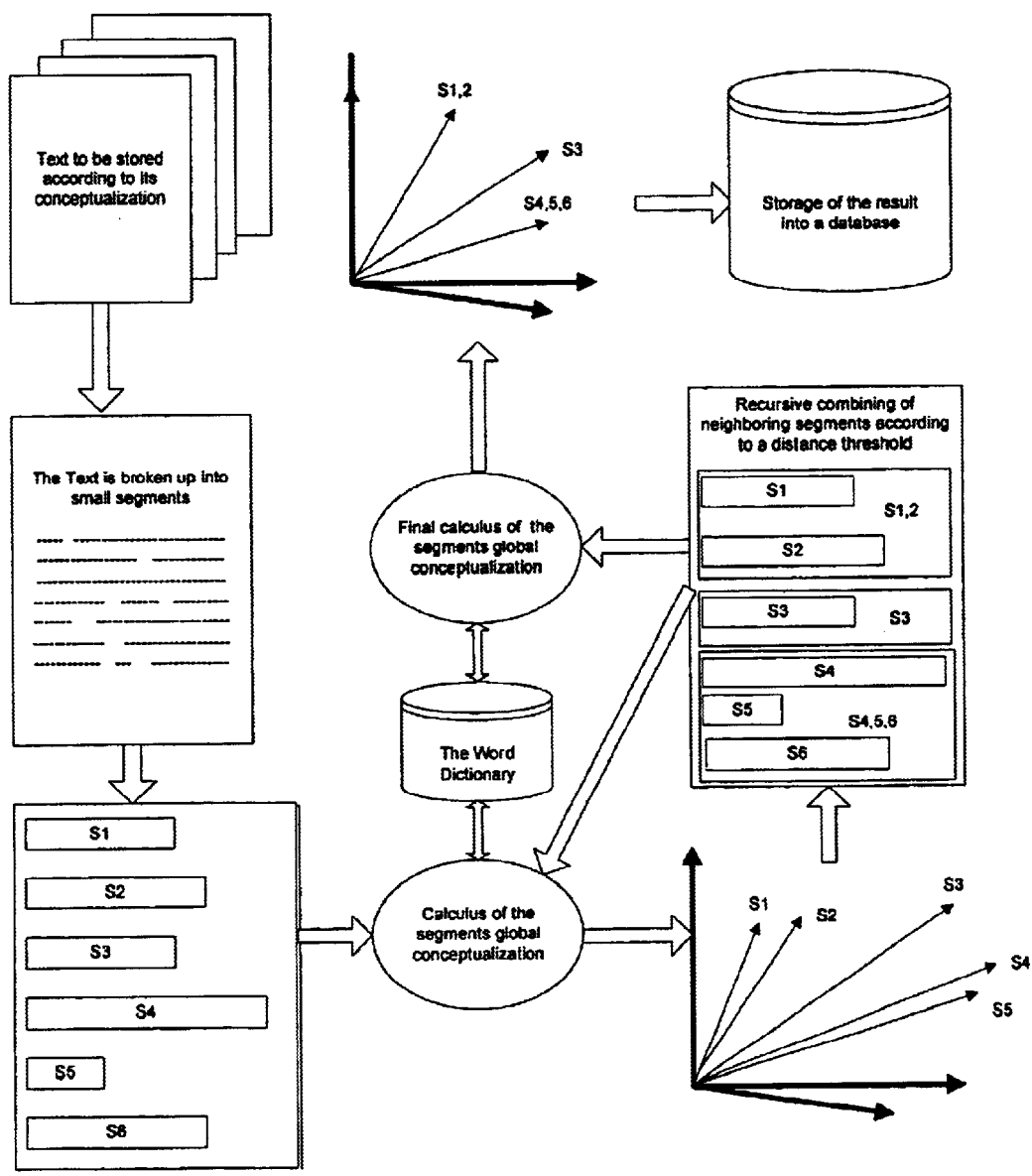

PROCESS FOR STORING TEXT AND PROCEDURE FOR SEARCHING STORED TEXTS FOR THOSE PERTINENT TO A QUESTION

BACKGROUND OF THE INVENTION

With the modern word processing methods, of rare permanence, the world of documentation has recently experienced substantial expansion. As the requirements or desire for knowledge on the part of individuals increase, the information itself is also increasing, perhaps even more so. The number of papers, reviews, journals and other publications of all kinds, even on a particular subject, is also continuing to expand. The storage or filing of data has become a difficult task. Conversely, the retrieval of data from a stored batch is no easier today.

The key-word solution to this twofold problem is well known. Given the size of data banks, this is a solution that is often no longer appropriate, since querying a key word produces both too many and not enough documents as a result of the failure to take into account both homonymy (non-pertinent documents) and synonymy.

Analysis and search, now microscopic, need to become macroscopic and that is what the applicant is seeking to offer here. Documentalists and archivists have to move from words to concepts, ideas, in other words, to the plurality, the combination and the association of words.

SUMMARY OF THE INVENTION

The invention covers the process for the analysis and storage-filing of texts as well as the search and retrieval of stored texts. In short, the invention seeks to offer tools for improving and organizing knowledge.

The invention covers first of all a process for storing a text according to which:
   a word dictionary is created in a multidimensional conceptual reference point,
   each conceptual word from at least a portion of the text to be stored is compared to the dictionary words to determine the position of this word in said reference point, and
   the resultant of the positions of all the conceptual words of the portion of text to be stored is determined in order to identify the position of a global conceptualization of the portion of text in said reference point and to store this position.

The term "word" must naturally include the linguistic unit, that is to say the word in the proper sense of the term, but also the group of words that form a unitary semantic expression, such as, for example, "heart attack".

The axes of the reference point according to the invention, equal in number to the dimensions, correspond to the different concepts expressed in the dictionary.

A word, in the process according to the invention, is defined by a point or by a vector that extends from the origin of the reference mark to this point, whose coordinates, on the axes of the reference point, correspond respectively to the relative weight of the different concepts attached to this word.

Finally, the storage procedure according to the invention consists in vectorizing the words of a text and calculating their conceptual resultant which is representative of the entire text in a reference of a plurality of concepts.

Advantageously, to determine the resultant of the positions in the reference of all the conceptual words of the portion of text to be stored, each word position in the reference is first matched to its position in the text and its syntactic role.

Also advantageously, in order to determine the resultant of the positions of the conceptual words of the portion of text to be stored, these positions are multiplexed by a composition algorithm.

The invention also covers a process for searching among a plurality of texts stored according to the above-cited procedure for those that deal with a particular question, in which:
   as for text storage, the position in the multidimensional conceptual reference of a global conceptualization of the question by determining the resultant of the positions of all the conceptual words of the question and
   the position of the overall conceptualization of the question is compared to the homologous positions of the stored texts in order to select at least one of them, corresponding to a searched text.

Advantageously, the positions of the global conceptualizations of the question are compared to the stored texts, determining, for each text, a distance between the two respective positions of the question and of the text.

Preferably, the distance determined between two positions is non-Euclidean.

DETAILED DESCRIPTION OF THE INVENTION

The invention will be more fully understood from the following description of different forms of embodiment of the process for the storing of texts and the procedure for searching among stored texts for those that deal with a given question, with reference to the single annexed FIGURE which represents a multidimensional conceptual reference point.

For the sake of clarity, and in order to create a better understanding of the invention, the example that will now be described is an instructional example, an extremely simplified textbook case.

The text storage procedure will first be set forth in detail.

1—TEXT STORAGE PROCEDURE

1.1—Creation of a Word Dictionary

First of all, it is recalled that the term "word" is intended to designate a linguistic unit, that is, both a word in the proper sense of the term and a group of words forming a unitary semantic expression such as, for example, "heart attack", "identity card", "secondary sector", etc.

Let us posit a vectorial space of n dimension, n being a natural whole number greater than one, to which is attached a conceptual reference point $\mathfrak{R}$, a scalar product and an associated norm. The reference point $\mathfrak{R}$ is made orthonormal. The term orthonormal reference is intended to designate a base of n orthogonal vectors (for the defined scalar product) and a norm equal to one (for the defined norm). By definition, the vectors of the base are vectors by linear combination, all of whose vectorial space vectors can be defined.

In the instructional example of the description, the vectorial space is three-dimensional and provided with a Euclidean scalar product and the associated Euclidean norm, as well as a conceptual reference point $\mathfrak{R}$, represented on the figure, including three main lines $A_1$, $A_2$, $A_3$ carrying base vectors $\vec{u}_1$, $\vec{u}_2$, $\vec{u}_3$ respectively, whose respective coordinates in the reference point $\mathfrak{R}$ are (1, 0, 0), (0, 1, 0) and (0, 0, 1).

First of all, it will be noted that a position in the reference point $\Re$ is defined by a triplet of coordinates respectively following axes $A_1$, $A_2$, $A_3$, and that for each position in the reference $\Re$ there is a corresponding vector with the same coordinates, extending from an origin o of the reference point $\Re$. Subsequently, the terms "position" and "vector" will therefore be merged.

By definition, the Euclidean scalar product of two vectors $\vec{X}$ and $\vec{Y}$ is equal to the sum of the products of the homologous coordinates of vectors $\vec{X}$ and $\vec{Y}$. The mathematical formula for calculating the Euclidean scalar product is therefore as follows:

$$\langle \vec{X}, \vec{Y} \rangle = \sum_{i=1}^{n} x_i \cdot y_i$$

in which $\langle \vec{X}, \vec{Y} \rangle$ represents the scalar product of X and Y and $x_1$ and $y_1$ represent the respective coordinates of vector X and of vector Y along axis $A_1$, with n representing the dimension of the vectorial space, equal to three in the example of the description.

The Euclidean norm $\|\vec{X}\|$ of vector $\vec{X}$ is defined by the following formula:

$$\|\vec{X}\| = \sqrt{\sum_{i=1}^{n} x_i^2}$$

The unit of each axis corresponds to a concept, an idea expressed in the dictionary. In the case in point:

the unit of axis $A_1$ corresponding to the concept of physics, the unit of axis $A_2$ corresponding to the concept of the liquid state, and the unit of axis $A_3$ corresponds to the concept of printing.

Physics, the liquid state and printing are therefore the three concepts of the conceptual reference $\Re$ corresponding to the three dimensions of the reference point $\Re$.

In order to create the word dictionary, the conceptual words are taken from among the words in the language, and the position of each of these words in the conceptual reference $\Re$ is determined.

The terms "conceptual word" mean an important word in the text, loaded with meaning, expressing one or more ideas, and contributing therefore in a major way to giving the text its overall meaning. In short, a conceptual word is a word that can make reference to at least one concept of the conceptual reference.

For the sake of clarity, a dictionary is created here containing only the words necessary to an understanding of the particular example of the description, to wit the following words: body, plunge, liquid, undergo, thrust, vertical, police, think, drowning, style, fluid, idea, miss, mechanics.

It is clear that a word can have a number of meanings and it is generally possible to determine the sense in which this word is being employed in a text, in terms of the context of the text.

In order to introduce each of these words into the dictionary, all the possible meanings of the word are searched, all the concepts relative to the reference point $\Re$ to which this word can possibly make reference are deduced, and, in terms of these concepts, a position is assigned in the conceptual reference $\Re$. The coordinates of the position of each word correspond to the relative weights of the various concepts attached to this word. In the dictionary, each of the words is associated with a position represented by a triplet of coordinates in the reference $\Re$.

To illustrate this step in the creation of the dictionary, let us specify in greater detail the introduction of certain particular words into the dictionary.

Let us first of all take the word "body". According to the dictionary "Le Petit Robert" (Le Robert dictionaries edition, 1993), the term body can designate "any material body characterized by its physical properties", and "the body of a letter" refers to the "dimension of a print character". From this, one can deduce that the word "body" can, depending on its utilization, refer either to the concept of physics or to the concept of printing. On the other hand, in neither of its meanings does "body" refer to the concept of the liquid state. The word body is therefore likely to make reference to the concept of physics (axis $A_1$) as well as to the concept of printing (axis $A_3$). Consequently, it is assigned a position in the conceptual reference $\Re$ a position whose coordinates are (1, 0, 1).

Now let us take the word "plunge", which can mean, specifically, "to cause to enter into a liquid", according to the dictionary Le Petit Robert. This word is therefore capable of making reference to the concept of liquid state (axis $A_2$) but in neither of these senses does it refer to the concept of physics (axis $A_1$) or to the concept of printing (axis $A_3$). Consequently, the word "plunge" is assigned a position in the conceptual reference $\Re$ a position whose coordinates are (0, 1, 0).

Table 1 contains the coordinates of the positions of all the words in the dictionary, determined according to the steps that have just been detailed for two individual examples.

TABLE 1

| Words | Coordinates | | |
|---|---|---|---|
| | $A_1$ | $A_2$ | $A_3$ |
| body | 1 | 0 | 1 |
| plunge | 0 | 0 | 1 |
| liquid | 1 | 1 | 0 |
| undergo | 0 | 0 | 0 |
| thrust | 1 | 0 | 0 |
| vertical | 0 | 0 | 0 |
| police | 0 | 0 | 1 |
| think | 0 | 0 | 0 |
| drowning | 0 | 1 | 0 |
| style | 0 | 0 | 1 |
| fluid | 1 | 1 | 0 |
| idea | 0 | 0 | 0 |
| miss | 0 | 0 | 0 |
| mechanics | 1 | 0 | 0 |

1.2—Global Conceptualization of the Texts to be Stored

In the instructional example of the description, there are three texts to be stored, as follows:

Text 1; "Any body plunged into a liquid undergoes a vertical thrust."

Text 2; "The police think this was a drowning".

Text 3; "The style is fluid but ideas are missing."

In a preliminary step, a syntactic analysis is made of each text to be stored in order to extract the conceptual words.

Thanks to the extraction of the conceptual words, words that make only a minor contribution to the global sense of the text, such as pronouns, articles, preposition, etc., are eliminated from the next stage of text "vectorizing".

To illustrate this extraction step, let us apply it to text 1. After the analysis of this text and the extraction of conceptual words, the following conceptual words are obtained: body, plunged, liquid, undergoes, thrust and vertical.

The inflected conceptual words (in other words, the conjugated verbs, adjectives in agreement, plural nouns, etc.) are then transformed into their non-inflected form.

The conceptual words extracted from texts 1, 2 and 3, and transformed, if necessary, into their non-inflected form, are detailed in table 2.

TABLE 2

| Texts | Words extracted |
|---|---|
| 1 | body, plunge liquid undergo, thrust, vertical |
| 2 | police, think, drowning |
| 3 | style, fluid, idea, miss, mechanics |

For each text to be stored, the position of each of the conceptual words of this text is determined by comparing each of these conceptual words to those of the dictionary in which the words are each associated with a position in the reference $\Re$.

In case a conceptual word in the text and a dictionary word are identical, the position in the reference $\Re$ associated with this word is read in the dictionary, and this position is assigned to the conceptual word in the text. The positions thus determined for the conceptual words extracted from texts 1 to 3 are as indicated in table 1.

Then, for each text to be stored, the resultant of the positions in the reference $\Re$ of all the conceptual words of the text is determined by multiplexing these positions by means of a composition algorithm. This algorithm consists here in finding the vectorial sum of the positions of all the conceptual words of the text to be stored, that is, adding up the homologous coordinates of the positions of the conceptual words of the text.

Then, the resultant of the positions of all the conceptual words of the text to be stored is normalized and the position of a global conceptualization of this text in the reference $\Re$ is obtained.

By definition, a vector is normalized when its norm is equal to one. The step seeking to "normalize" a vector therefore consists in dividing this vector by its own norm.

The mathematical formula for determining the global conceptualization position of index j text is therefore:

$$\vec{t}_j = \frac{\vec{T}_j}{\|\vec{T}_j\|} = \frac{\sum_{i=1}^{N_j} \vec{m}_{ij}}{\left\|\sum_{i=1}^{N_j} \vec{m}_{ij}\right\|}$$

$\vec{m}_{ij}$ represents the vector of the index I conceptual word of the index j text, $\vec{T}_j$ represents the resultant of the positions of all the conceptual words of the index j text, and $\vec{t}_j$ represents the global conceptualization vector of the index j text, with natural integer i varying between 1 at $N_j$ ($N_j$ representing the total number of conceptual words of the index j) text, and natural integer j varying between 1 and 3.

The global conceptualization vector $\vec{t}_j$ of index j text constitutes a vectorial representation, in the conceptual reference $\Re$, of the overall meaning of index j text.

The coordinates of global conceptualization vectors $\vec{t}_1$, $\vec{t}_2$, $\vec{t}_3$ of texts 1, 2 and 3, respectively, are listed in table 3.

TABLE 3

| Text j | Resultant $\vec{T}_1$ | Global conceptualization vector $\vec{t}$ |
|---|---|---|
| Text 1 | (3, 2, 1) | (0.802, 0.535, 0.267) |
| Text 2 | (0, 1, 1) | (0, 0.707, 0.707) |
| Text 3 | (2, 1, 1) | (0.816, 0.408, 0.408) |

Finally, the global conceptualization positions of texts 1, 2 and 3 are stored.

2—SEARCHING AMONG THE MANY STORED TEXTS FOR THOSE THAT DEAL WITH A PARTICULAR SUBJECT

At this point, the goal is to search among the stored texts (texts 1, 2 and 3), those that deal with a specific subject which, here, is "fluid mechanics".

As for the storage of texts, a syntactic analysis is made of the words of the question in order to extract the conceptual words which, in this case, are "mechanics" and "fluid".

In the event the question contains inflected conceptual words, these words can be transformed into their non-inflected form.

Each of the conceptual words of the question is compared to those of the dictionary in order to determine their position in the conceptual reference $\Re$. The respective positions of the word "mechanics" and of the word "fluid" are indicated in table 1.

Then, the resultant $\vec{Q}$ of the positions of all the conceptual words of the question is determined by multiplexing the positions of the conceptual words of the question using the composition algorithm utilized for storing texts. Finally, the resultant $\vec{Q}$ is normalized in order to obtain the global conceptualization vector $\vec{q}$ of the question.

The coordinates of vectors $\vec{Q}$ and $\vec{q}$ are, respectively, (2, 1, 0) and (0.894, 0.447, 0).

Then, the global conceptualization position of the question is compared to the homologous global conceptualization positions of the stored texts in order to retain at least one of them, corresponding to a text looked for. This comparison consists in calculating, for each index j text stored (with natural integer j equal to 1, 2 or 3), the distance $D_j$ between the two respective positions of the question and of the text.

The distance $D_j$ between the global conceptualization vector $\vec{q}$ of the question and the global conceptualization vector $\vec{t}_j$ of the index j text stored is calculated here using the following formula:

$$D_j = 1 - <\vec{t}_j, \vec{q}>$$

It should be noted that calculation of the distance $D_j$ uses the scalar product of vector $\vec{t}_j$ of the index j text and vector $\vec{q}$ of the question ($<\vec{t}_j, \vec{q}>$).

Calculation of the distance $D_j$ between the respective positions of the question and of each of the index j texts stored (with j equal to 1, 2 or 3) makes it possible to evaluate the similarity between the question and each of the stored texts.

The results of these distance calculations are indicated in table 4.

TABLE 4

|  | Distance $D_j$ |
|---|---|
| text 1/question | 0.044 |
| text 2/question | 0.688 |
| text 3/question | 0.088 |

Based on these results, the most pertinent text, which is one for which the distance $D_j$ is the shortest, is text 1, which indeed corresponds to the actual situation.

It should be stressed that text 1 is determined to be more pertinent than text 3, despite the presence in the latter of the term "fluid".

In the preceding description, the global conceptualization vector of a text or of the question, is the normalized resultant of the positions of all the conceptual words of this text or of the question. It would also be possible to envisage defining the global conceptualization vector of a text or of a question as the non-normalized resultant of the positions of all the conceptual words of this text or of this question.

The formula for calculating the distance $D_j$ between the respective positions of the question and an index j stored text would therefore be as follows:

$$D_j = 1 - \frac{\langle \vec{Q}, \vec{T}_j \rangle}{\|\vec{Q}\| \cdot \|\vec{T}_j\|}$$

$\vec{Q}$ represents the global conceptualization vector of the question and $\vec{T}_1$ represents the global conceptualization vector of the index j text.

Indeed, in this case, the resultant of the positions of the conceptual words is normalized by calculating the distance between the respective global conceptualization positions of the text and of the question.

In a variant which differs from the detailed description above only in terms of what will now be described, the multidimensional vectorial space is given a non-Euclidean scalar product and an associated non-Euclidean norm.

The non-Euclidean scalar product of two vectors $\vec{X}$ and $\vec{Y}$ is defined by the following formula:

$$\langle \vec{X}, \vec{Y} \rangle = \sum_{i=1}^{n} \frac{1}{k_i} \cdot x_i \cdot y_i$$

The norm associated with vector $\vec{X}$ is defined by the following formula:

$$\|\vec{X}\| = \sqrt{\sum_{i=1}^{n} \frac{1}{k_i} \cdot x_i^2}$$

$x_i$ and $y_i$ represent the respective coordinates of vector $\vec{X}$ and of vector $\vec{Y}$ along axis $A_i$ of the conceptual reference and $k_i$ represents a weighting coefficient relative to axis $A_i$, with natural integer i varying between 1 and n, n representing the dimension of the vectorial space.

The coefficient $k_i$ is fixed in relation to the index i axis in terms of the importance of the concept expressed by this axis in the conceptual reference.

In this variant, in order to search among a number of stored texts those that are pertinent with respect to a question, the global conceptualization positions of the question and of the stored texts are compared, and for each text, the distance between the two respective positions of the question and of the text is determined using the distance calculation formula specified in the first form of embodiment of the search procedure described, and used the non-Euclidean scalar product as defined above.

In a second form of embodiment of the text storage procedure, which differs from the first form of embodiment described only in terms of what will now be described, for each text to be stored, one first associates to the position $P\Re$ in reference $\Re$ of each conceptual word of this text its position in the text $P_T$ as well as its syntactic role $R_{synt}$ in the text, in order to form, for each conceptual word extracted from the text, a triplet ($P\Re, P_T, R_{synt}$) containing the position $P\Re$ in reference $\Re$ of the word, its position $P_T$ in the text and its syntactic role $R_{synt}$.

For each text to be stored, the resultant of the positions of the conceptual words of the text is determined by multiplexing the triplets of all the conceptual words of the text by a composition algorithm, in order to determine the position of the global conceptualization of this text.

In order to search among the texts stored according to this storage procedure, for those that deal with a question, the position of the global conceptualization of the question is determined. To do this, as for the storage of texts, the resultant of the positions of conceptual words of the question is determined by associating each conceptual word of the question with a triplet containing the position of this word in the reference $\Re$, its position in the question and its syntactic role in the question and by multiplexing these triplets by means of the composition algorithm used for the storage.

The position of the global conceptualization of the question is then compared to the homologous positions of the stored texts, by calculating the distance between these positions. From this is deduced the similarity between the question and the stored texts and, therefore, the most pertinent texts that deal with the question.

In a third form of embodiment of the text storage procedure, which differs from the first form of embodiment described only in terms of what will now be described, the text is broken up into a number of segments. Each segment initially contains a predefined number of conceptual words, five in this case, that are close to one another in the text.

Two segments are referred to as "close" or "neighboring" when they are side by side in the text or separated from one another only by non-conceptual words.

The positions in the conceptual reference of all the conceptual words of the text are determined. For each text segment, the resultant of the positions of all the conceptual words of this segment is determined by multiplexing these positions by means of the composition algorithm utilized in the first form of embodiment of the storage procedure described. This resultant is then normalized in order to obtain the global conceptualization position of the segment in the conceptual reference.

The global conceptualization positions of the neighboring segments in the text are then compared two by two by calculating, for each pair of neighboring segments, the distance between the two respective conceptualization positions of the two segments, using the calculation formula of the distance specified in the first form of embodiment of the search procedure.

If the distance between the respective global conceptualization positions of two neighboring segments is under a predefined threshold, in other words, if these two segments have close meanings, these two segments are combined to form a new segment whose global conceptualization position is then determined.

On the other hand, if the distance between the global conceptualization positions of two neighboring segments is above the predefined threshold, in other words, if these two segments have unrelated meanings, the two segments are not combined.

The step that consists in combining the neighboring segments is repeated until they can no longer be combined. The iterative regrouping of segments delimits a number of text portions that are such that the distance between the respective global conceptualization positions of two neighboring text portions is over the predefined threshold. In other words, the global meaning of each part of the text is quite removed from the global meaning of a neighboring part.

To compare a question and a stored text containing a number of portions each represented by its global conceptualization position in the conceptual reference, the position of each of the text portions is compared to the position of the question, by calculating the distance between these positions. A text is considered to be pertinent if the distance between the position of one of its portions and the position of the question is short.

Of course, the question could be broken down into a number of portions each represented by its global conceptualization position.

In this case, the vectors of the portions or a stored text and those of the portions of the question would be compared two by two. The text is considered to be pertinent if the distance between the position of one of its portions and the position of one of the portions of the question is short.

It should be noted that in the third form of embodiment of the storage procedure, each of the portions of a text is stored in the same way that a text (consisting of only one portion) is stored in the first mode of the storage procedure. Finally, a "text" and a "text portion" are two equivalent word sets.

Concerning the composition algorithm for determining the resultant of conceptual word positions of a text, a text segment or a question, it is also possible, instead of only finding the vectorial sum of the positions of the conceptual positions of the text, text segment or question, to amplify the values of the strongest coordinates of the vector resulting from the vectorial sum of the positions of the conceptual words, for example by multiplying them by a predefined coefficient. In this way, the importance of the most important concepts is further amplified to the detriment of the less important concepts, in order to prevent any possible ambiguity when comparing the global conceptualization vectors of a text and of a question. Indeed, the interference due to the fact that the coordinates have weak conceptualization vector values is therefore reduced.

To illustrate this variant, let us apply it to text 1. By finding the vectorial sum of the positions of all the conceptual words of this text, the vector (3, 2, 1) is obtained. In order to obtain the resultant of the positions of all the conceptual words of text 1, the strongest coordinates, which are those along axes $A_1$ and $A_2$, are multiplied by a coefficient which here is equal to 2. The resultant of text 1 is therefore the vector (6, 4, 1).

In the instructional example described above, the question "fluid mechanics" contained few words. Obviously, one could take a question containing many more words and even comprise a text.

In practice, the conceptual reference $\Re$ includes several hundred dimensions, and the dictionary contains several thousand words.

What is claimed is:

1. Storage procedure for storing in a data base text containing a number of segments whose respective global conceptualization positions in the conceptual reference are determined and the respective global conceptualization portions of the neighboring segments in the text are compared in order to limit the said number of text portions, wherein,
   a dictionary of words is created in a multidimensional conceptual reference,
   each conceptual word of each portion of the text to be stored is compared to those of the dictionary in order to determine the position of said each conceptual word in said reference and
   the resultant ($\vec{T}_1$) of the positions of all the conceptual words of the text portion to be s stored is determined in order to determine the position of a global conceptualization of the text portion in said reference and to store said position of a global conceptualization in said data base;
   wherein, in which, in order to compare the respective global conceptualization positions of two neighboring segments of the text, the distance between these positions is determined and, in the event this distance is under a predefined threshold, the two segments are combined to form a new segment.

2. Procedure according to claim 1, in which, to determine the resultant of the positions in the reference of all the conceptual words of the text portion to be stored, each word position in the reference is first associated with its position in the text and its syntactic role.

3. Procedure according to claim 1, in which, to determine the resultant ($\vec{T}_1$) of the positions of the conceptual words of the text portion to be stored (1), use is made of a composition algorithm consisting in finding the vectoral sum of the positions of all the conceptual words of the text portion to be stored (1).

4. Procedure according to claim 3, in which the composition algorithm also consists in amplifying the importance of the most important concepts.

5. Procedure according to claim 1, in which the resultant ($\vec{T}_1$) of the positions of all the conceptual words of the text portion to be stored (1) is normalized.

6. Procedure according to claim 1, in which the multidimensional conceptual reference is made orthonormal.

7. Procedure according to claim 1, in which, for each word to be included in the dictionary, all the concepts related to the conceptual reference to which this word can make reference are searched and, in terms of these concepts, the word is assigned a position in the conceptual reference.

8. Procedure according to claim 1, in which an syntactic analysis of all the words of the text portion (1) is made in order to extract the conceptual words.

9. Procedure according to claim 1, in which the text portion to be stored having inflected words, said inflected words, are transformed into the non-inflected form.

10. Procedure according to claim 1, in which the text portions are formed by iterative groupings of segments.

11. Procedure for searching among a number of stored texts according to the storage procedure of claim 1 for those that deal with a particular question, in which:

as for any text storage, the position in the multidimensional conceptual reference of a global conceptualization of the question is determined by determining the resultant ($\vec{Q}$) of the positions of all the conceptual words of the question and the position of the global conceptualization of the question is compared to the homologous positions of the stored texts in order to select at least one of them corresponding to a searched text.

12. Procedure according to claim 11, in which the positions of the global conceptualizations of the question and of the stored texts are compared by determining, for each text, the distance between the two respective positions of the question and of the text.

13. Procedure according to claim 11, in which calculation of the distance between two positions in the conceptual reference utilizes the scalar product of these positions.

14. Procedure according to claim 13, in which the distance between two positions in the conceptual reference is calculated using the following formula:

$$D = 1 - \frac{\langle \vec{X}, \vec{Y} \rangle}{\|\vec{X}\| \cdot \|\vec{Y}\|}$$

in which $\vec{X}$ and $\vec{Y}$ represent the two positions,

D represents the distance between the two positions $\vec{X}$ and $\vec{Y}$, $\langle \vec{X}, \vec{Y} \rangle$ represents the scalar product of $\vec{X}$ and of $\vec{Y}$, and $\|\vec{X}\|$ and $\|\vec{Y}\|$ represent the respective norms of $\vec{X}$ and $\vec{Y}$.

15. Procedure according to claim 11, in which the distance determined between two positions is non-Euclidean.

16. Produce according to claim 15, in which the distance determined between two positions uses the scalar product defined by the following formula:

$$\langle \vec{X}, \vec{Y} \rangle = \sum_{i=1}^{n} \frac{1}{k_i} \cdot x_i \cdot y_i$$

in which $\langle \vec{X}, \vec{Y} \rangle$ represents the scalar product of two positions $\vec{X}$ and $\vec{Y}$, n, a natural integer, represents the dimension of the conceptual reference containing n index i axes whit a natural integer i varying between 1 and n, $x_i$ and $y_i$ represent the respective coordinates of the positions X and Y along the index i axis and $k_i$ represents a weighting coefficient relative to the index i axis.

17. Procedure according to claim 11, in which the resultant ($\vec{Q}$) of the positions of all the conceptual words of the question is normalized.

18. Procedure according to claim 11, in which a syntactic analysis is made of all the words of the question in order to extract the conceptual words.

19. Procedure according to claim 11, in which the question having inflected words, said inflected words are transformed into their non-inflected form.

* * * * *